United States Patent Office 2,980,729
Patented Apr. 18, 1961

2,980,729

PROCESS OF PRODUCING ESTERS OF METH-
YLENE BIS-THIOGLYCOLIC ACID

Raymond Buret, Villiers-sur-Marne, France, assignor to
UCLAF, Paris, France, a corporation of France No Drawing. Filed July 23, 1958, Ser. No. 750,302

Claims priority, application France Aug. 2, 1957

2 Claims. (Cl. 260—481)

The present invention relates to a process of producing esters of methylene bis-thioglycolic acid and more particularly to a process of producing alkyl or aralkyl esters of methylene bis-thioglycolic acid.

Heretofore, methylene bis-thioglycolic acid has been prepared by heating to 100° C. the sodium salt of mono-chloro acetic acid in aqueous solution with sodium thiosulfate, acidifying the reaction mixture after cooling, and condensing the resulting reaction product by boiling under reflux with formaldehyde. The yield obtained thereby does not exceed about 38% of the theoretical yield.

Esters of methylene bis-thioglycolic acid and, more particularly, the butyl ester and the 2-ethyl hexyl ester are of considerable industrial interest as they are used as plasticizers as well as adjuvants in the treatment of certain types of synthetic rubber. It is, therefore, of considerable importance to produce these esters in a much better yield from chloro acetic acid than heretofore possible.

It is one object of the present invention to provide a simple and effective process of producing esters of methylene bis-thioglycolic acid in a high yield.

This and other objects and advantageous features of the present invention will become apparent as the description proceeds.

In principle, the process according to the present invention involves subjecting an aqueous solution of chloro acetic acid to the action of sodium thiosulfate at a moderately elevated temperature for a limited period of time and condensing the resulting product with about equimolecular amounts of formaldehyde in the presence of sulfuric acid. The resulting crude methylene bis-thio-glycolic acid is then directly esterified without isolation, under azeotropic esterification conditions. Preferably cyclohexane is used as agent for carrying along by azeotropic distillation the water formed on esterification. Condensation of the sodium salt of monochloro acetic acid with sodium thiosulfate is preferably carried out at a temperature of about 80° C. and the resulting condensation product is reacted with formaldehyde in the presence of sulfuric acid at about the same temperature. At the end of the reaction the temperature of the reaction mixture is raised to its boiling temperature for a few minutes only, in order to complete esterification.

When proceeding according to the present invention, the disadvantages of the heretofore known processes of preparing methylene bis-thioglycolic acid are overcome. The reaction time is reduced to about one tenth of the reaction time required heretofore. The reaction temperature is lowered considerably. The yield of the final reaction product, the ester of methylene bis-thioglycolic acid is increased to more than 80% calculated for reacted chloro acetic acid. These advantages of the process according to the present invention are, of course, of great importance and permit the production of said esters on a large scale.

The following examples serve to illustrate the present invention without, however, limiting the same thereto. More particularly, other alcohols than those mentioned in the examples may be used for esterification and other solvents than cyclohexane may be employed for carrying along the water formed on esterification in accordance with the principles set forth herein and in the claims annexed hereto.

EXAMPLE 1

Preparation of the butyl ester of methylene
bisthioglycolic acid 20 kg. of monochloro acetic acid are dissolved in 40 l. of water. The solution is neutralized by the addition of about 11 kg. of sodium carbonate. The resulting solution of the sodium salt of monochloro acetic acid is added to 50 kg. of sodium thiosulfate and the mixture is heated for half an hour at 80° C. After cooling to 60° C., 2 l. of 50% sulfuric acid and, after stirring, 11 l. of an aqueous 30% formaldehyde solution and, thereafter, 30 l. of 50% sulfuric acid are added. The reaction mixture is heated for half an hour at 80° C. and is finally refluxed for 10 minutes. After cooling, the mixture is filtered and the filtrate is allowed to stand for 2 hours for crystallization. By repeating said step a second time, about 52 kg. of methylene bis-thioglycolic acid are obtained. The crude product is mixed with 38 l. of butanol and 20 l. of cyclohexane. The mixture is refluxed for 10 minutes, cooled, and allowed to stand for half an hour. The lower layer is separated and the organic solution is refluxed whereby the water which separated as lower layer in a separating device, is removed from the distillate. Thereby, 9 l. to 11 l. of water are collected. Then another 20 l. of cyclohexane and 5 l. of an aqueous solution containing 0.4 kg. of sodium carbonate are added. The mixture is stirred for 10 minutes and allowed to stand for half an hour in order to cause separation into two layers. The lower aqueous layer is again separated and the organic layer is washed twice with water, whereby the wash waters are removed by decanting. The cyclohexane is distilled off from the washed organic layer with stirring until the distillation temperature is raised to 95° C. Thereby 38 l. of cyclohexane are recovered. Distillation is continued until the temperature reaches 105° C., whereby a small amount of butanol distills off. Thereafter, the mixture is subjected for one hour to a vacuum at a temperature of 130° C. measured in the interior of the distillation vessel. Thereby, 54 kg. of a somewhat oily, clear, slightly yellow liquid is obtained, which oil represents the butyl ester of methylene bis-thioglycolic acid.

EXAMPLE 2

Preparation of the 2-ethyl hexyl ester of methylene bis-
thioglycolic acid

A mixture of 2.026 g. of crude methylene bis-thioglycolic acid obtained according to the preceding example, 1.670 g. of 2-ethyl hexyl alcohol, and 3.000 g. of cyclohexane are heated for 50 minutes with stirring and then subjected to an azeotropic distillation as described in said example. Azeotropic distillation requires 5 hours. Water and cyclohexane are then distilled off until the temperature reaches 95° C. and distillation is continued in a vacuum until a temperature of 200° C. is measured in the interior of the distillation vessel. Thereby, 2.630 g. of the desired crude 2-ethyl hexyl ester of methylene bis-thioglycolic acid are obtained. This corresponds to a yield of 93.5% of the theoretical yield calculated for the alcohol used as starting material.

In place of n-butanol and 2-ethyl hexanol used for esterification in the examples, there may be employed other alcohols such as isoamyl alcohol, n-amyl alcohol, n-octyl alcohol, lauryl alcohol, cetyl alcohol, allyl alcohol, ethylene glycol, propylene glycol, glycerol, trimethylene glycol, benzyl alcohol, phenyl methyl carbinol, p-methyl benzyl alcohol, isooctyl alcohol.

Likewise, in place of cyclohexane as the one azeotrope, there may be employed other solvents of similar boiling point which form azeotropic mixtures with water, such as benzene and toluene.

I claim:

1. In the process of preparing methylene bis-thioglycolic acid, the steps which comprise heating an aqueous solution of the sodium salt of monochloro acetic acid with sodium thiosulfate at a temperature of about 80° C. for about 30 minutes, heating the resulting reaction product with formaldehyde in aqueous solution at a temperature of about 80° C. in the presence of sulfuric acid for about 30 minutes, and refluxing the reaction mixture for about 10 minutes to complete condensation to methylene bis-thioglycolic acid.

2. In the process of preparing esters of methylene bis-thioglycolic acid, the steps which comprise heating an aqueous solution of the sodium salt of monochloro acetic acid with sodium thiosulfate at a temperature of about 80° C. for 30 minutes, heating the resulting reaction product with formaldehyde in aqueous solution at a temperature of about 80° C. in the presence of sulfuric acid for about 30 minutes, refluxing the reaction mixture for about 10 minutes, and heating the resulting methylene bis-thioglycolic acid with an alkanol with 4 to 8 carbon atoms with the addition of an inert solvent forming an azeotropic mixture with water to cause esterification of the acid.

References Cited in the file of this patent

Strunnikov; Chem. Abst. vol. 35, col. 5805 (1939).
Stoner et al.: J.A.C.S., vol. 63, 987–8 (1941).
Westlake et al.: J.A.C.S., vol. 63, pp. 658–9 (1941).